C. S. ROBB.
MANUFACTURE OF WINDOW GLASS.
APPLICATION FILED DEC. 3, 1919.

1,356,739.  Patented Oct. 26, 1920.

WITNESS
Edwin Tuck
Lois Vrneman

INVENTOR
Clyde S. Robb
by C. M. Clarke
Atty

UNITED STATES PATENT OFFICE.

CLYDE S. ROBB, OF CHARLEROI, PENNSYLVANIA, ASSIGNOR OF ONE-HALF TO CHARLES J. KUNZLER, OF PITTSBURGH, PENNSYLVANIA.

MANUFACTURE OF WINDOW-GLASS.

1,356,739.

Specification of Letters Patent.

Patented Oct. 26, 1920.

Application filed December 3, 1919. Serial No. 342,153.

*To all whom it may concern:*

Be it known that I, CLYDE S. ROBB, a citizen of the United States, residing at Charleroi, in the county of Washington and State of Pennsylvania, have invented certain new and useful Improvements in the Manufacture of Window-Glass, of which the following is a specification.

My invention relates to improvements in the manufacture of window glass, particularly of the machine drawn kind. One disadvantage in the present method of forming mechanically drawn cylinders, from which the glass sheet it produced, is that it lacks the strength or temper which is ordinarily imparted to hand blown ware by the manipulation incident to its blowing by the operator. In such old method, the blower from time to time swings the glass cylinder in a pit during its elongation, blowing air into it at intervals, and also imparting to the cylinder variously different movements, the effect of which is to exert a pulling, and sometimes a twisting or turning, tension on the cylindrical wall during its formation. The result is that the finished cylinder being thus worked has a strengthening quality imparted to it due to such working or kneading manipulation which gives it a greatly added strength and tenacity, with a corresponding reduction in brittleness and tendency to break.

The invention has in view to impart to the drawing mechanism, in the operation of making machine drawn glass cylinders, a rotative action back and forth coincident with the longitudinal draw or formation of the cylinder, whereby to effect the same general result. Ordinarily, the bait in such operation is first lowered upon and slightly below the surface of the molten glass by a vertically operable suspending rod, and after the neck is formed, the bait is then slowly drawn upwardly, air being supplied in graduated amounts whereby to expand the cylinder to the desired diameter and to maintain it thereat uniformly during the drawing operation.

In my invention, I provide means for imparting the rotative action to the bait above noted so that, as the cylinder is formed by the upward drawing movement of the bait, the wall in formation is continuously subjected to a slight twisting action, first in one direction, then in another, so that the resulting cylinder is toughened and greatly improved in the manner noted.

While the desired movement may be imparted to the cylinder in several different ways, I have illustrated one practically operative mechanism in the drawings, it being understood that this may be substituted by others or changed or varied from by the skilled mechanic or designing engineer in degree of rotative movement, or various other features entirely within the scope of the present invention.

The drawing operation may be carried out by mechanism similar to that shown in my previous patent dated February 12, 1918, No. 1,256,260, or it may be utilized in connection with any well known apparatus for effecting the formation of a glass cylinder, and provided with means for partially rotating or oscillating the bait with relation to the bath, or vice versa.

Figure 1:
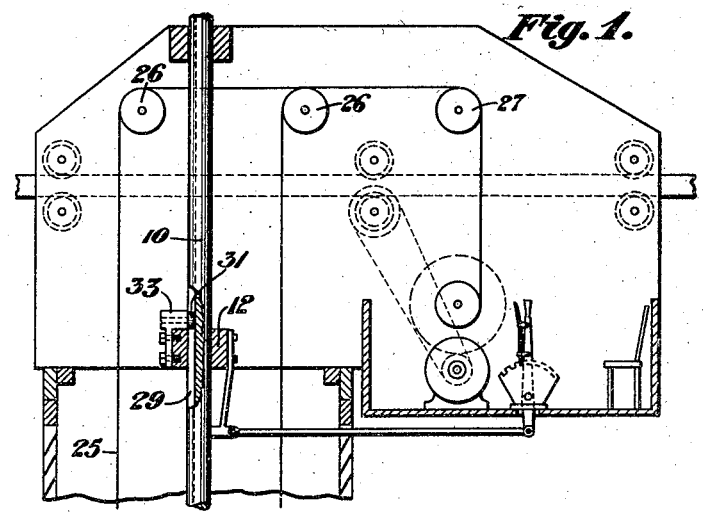
Figure 1 is a general view in sectional elevation showing a cylinder drawing apparatus adapted to carry out my improved method.
Figure 2:
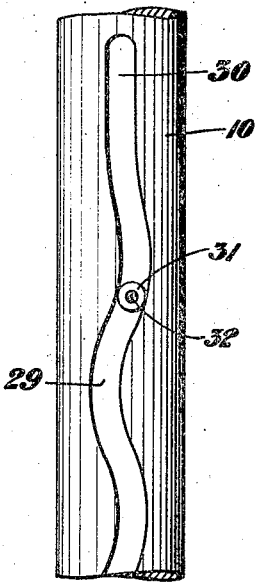
Fig. 2 is an enlarged detail view showing a portion of the lifting rod and the controlling means for effecting partial rotation of the bait.
Figure 3:
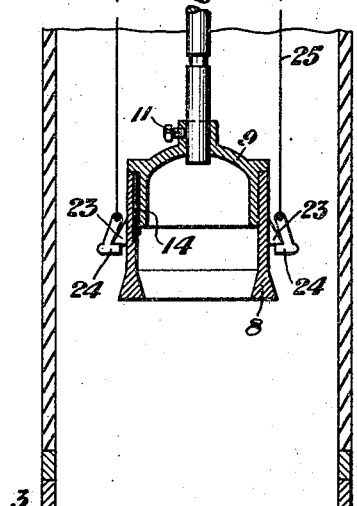
Fig. 3 is a partial view in elevation of a cylinder in process.
Figure 3:
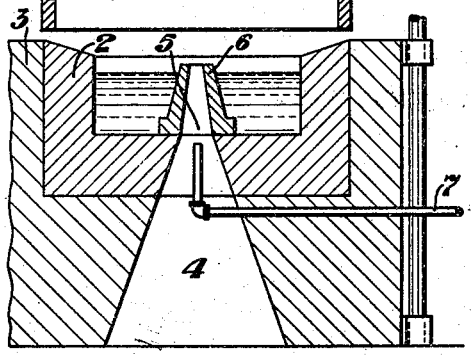

The glass from which the cylinder is formed is contained in any suitable receptacle as a pot 2 mounted on a foundation 3 provided with a centrally arranged lower well 4 communicating up through the center of the pot by an opening 5 through a hollow block or nozzle 6. Air is furnished by a pipe 7 or other suitable means. The bait 8, adapted to be lowered upon and into the molten glass and raised therefrom in the formation of the cylinder, is shown as detachably connected with a base 9, with which it is in telescoping engagement, as shown, the base having an annular flange abutting against the upper edge of the bait, or otherwise, as desired.

Base 9 is fixedly connected with the lower end of a vertically movable centrally arranged guide bar or rod 10 by a set screw 11, and rod 10 extends upwardly through guiding bearings 12—12 of a trolley cage or framework 13. Bearings 12 may, however, be stationary if desired, and the invention is in no way restricted to use with a portable drawing apparatus such as that illustrated. It is merely shown like that of my former patent above referred to for illustration, and the bait, of course, may be directly connected with the lower end of any suitable lifting mechanism. When the bait 8 is detachably mounted on the base 9, as shown, a spline or key 14 may be utilized to insure rotative or oscillating movement being imparted from the base to the bait, in the manner hereinafter set forth.

As shown, the bait is capable of being raised or lowered by flexible connections 25 having terminal hooks 24 engaging lugs 23, and passing over guide sheaves 26—27 to an operating drum 28, controlled by the operator, as will be readily understood.

For the purpose of imparting partial rotation to shaft 10 and to the bait, through base 9, or directly to the bait, the shaft is provided with a longitudinal cam groove 29 of undulating contour throughout the operative portion of the rod, except at its upper portion where the cam groove preferably terminates in a straight groove 30. A controlling abutment, as a roller 31, is mounted on a supporting stem 32 carried in a bracket 33 secured to one of the guiding bearings 12, so that as shaft 10 is raised or lowered, it and the bait and the suspended glass cylinder will be correspondingly slightly rotated in one direction and the other. This movement does not, however, ordinarily commence until the cap 34 of cylinder A has been formed, co-extensive with the straight portion 30 of the cam groove 29.

Ordinarily, such cap portion is cut off as waste and its strengthening treatment is not necessary in any event. As soon, however, as the cylinder has been inflated to its desired diameter, below the cap, the rotation of the bait will impart a corresponding rotation to the plastic portion of the glass in formation just above the surface of the bath and as it commences to set, so that there will be a continuous working of the cylinder wall throughout its formation in the manner above described during the whole extent of its upward travel.

The resulting cylinder will therefore have been subjected to a working treatment closely approximating that imparted to it by the hand blown operation, and with a correspondingly great increase in resulting toughness, strength and avoidance of brittleness, which qualities are enhanced by the usual subsequent annealing. After the entire cylinder is drawn, it is separated from the bath in the usual way, lowered and de-capped, split open, and annealed in the leer, as is the usual practice.

It will be apparent to those skilled in the art that the same effect in imparting the desired torsional working movement to the plastic portion of the cylinder in formation may be accomplished by rotation of the bath itself.

Figure 4:
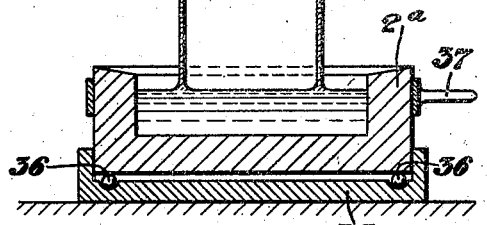
Fig. 4 is a sectional detail view showing an alternative utilization of the invention by rotation of the bath of molten glass.

Thus, in Fig. 4, I show a pot 2ᵃ containing a bath of molten glass from which the cylinder A is being drawn in the ordinary way. The pot is rotatably mounted in any suitable manner as upon a base 35 with intervening rolling bearings, as balls 36. Any convenient means for imparting rotative movement to the pot and the contained bath may be utilized, as a handle or lever 37, or suitable gearing designed to slowly rotate the pot in one direction and the other. The air supply in such case is through a hollow bait supporting rod.

It will be obvious also that both the bait and pot may be simultaneously rotated in opposite directions with the same result, the relative movement of each in such case being proportionately reduced to effect the desired ultimate twisting of the cylinder.

The advantages of my invention will be readily appreciated by all those skilled in the art. It will be found to very greatly reduce the breakage both in the course of manufacture and subsequently, which now constitutes an appreciable cause of loss, and to materially increase the strength and durability of the resulting product.

What I claim is:—

1. In the manufacture of window glass cylinders, the operation of upward drawing from a molten bath and simultaneously effecting a twisting of the cylinder wall between the bath and the cylinder in formation.

2. In the manufacture of window glass, the formation of a cylinder from a relatively stationary molten bath by means of upward drawing and annular oscillation with relation to the bath.

3. In the manufacture of window glass, the formation of a cylinder from a relatively stationary molten bath by means of an upwardly moving oscillating bait.

4. As a step in the manufacture of mechanically drawn window glass, the impartation to the cylinder-in-process of annular oscillation of the plastic portion of the cylinder between its fixed or set portion and the bath.

5. In the manufacture of window glass, the operation of forming a cylinder from a bath by an upwardly traveling bait, and imparting to the cylinder-in-process an additional annular movement between the bath and bait.

6. In the manufacture of machine drawn window glass, the process of forming a hollow cylinder by drawing the same from a molten bath and simultaneously effecting an annular movement of the cylinder wall in formation between its upper portion and its junction with the bath.

In testimony whereof I hereunto affix my signature.

CLYDE S. ROBB.